Sept. 30, 1952 A. G. FORSYTH 2,612,228
ELECTRICALLY DRIVEN PROPELLER PITCH CHANGE SYSTEM
Filed July 2, 1946 3 Sheets-Sheet 1

INVENTOR
ARCHIBALD
GRAHAM FORSYTH,
BY Robert B. [signature]
ATTORNEY

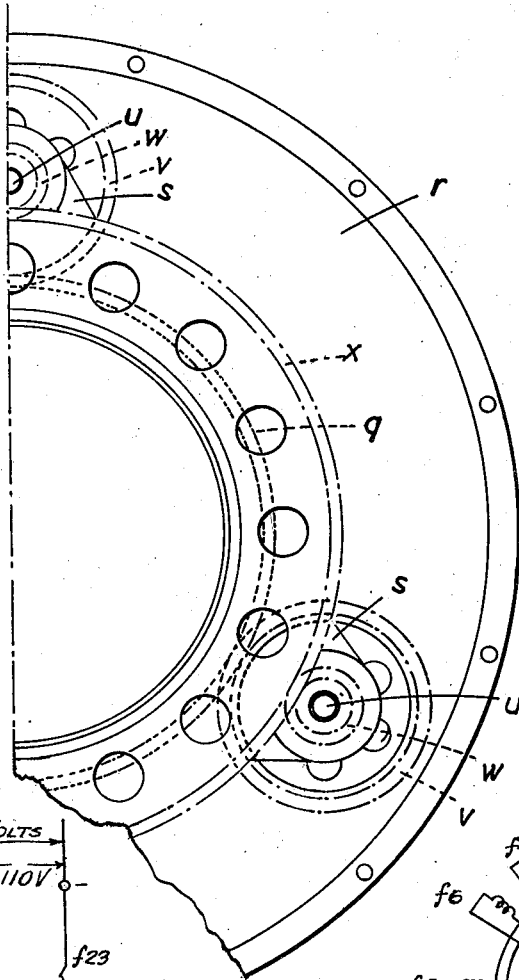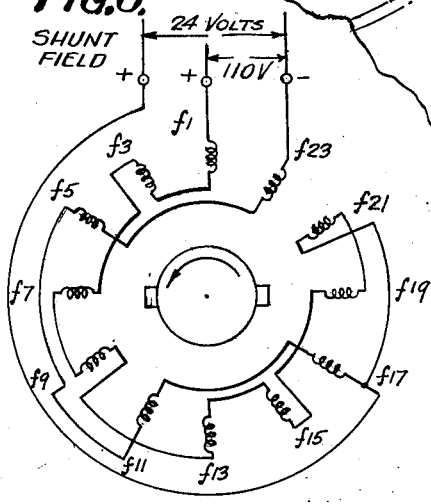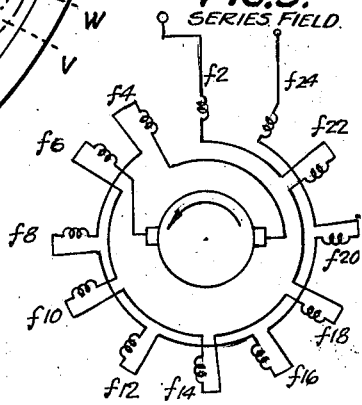

Sept. 30, 1952      A. G. FORSYTH      2,612,228
ELECTRICALLY DRIVEN PROPELLER PITCH CHANGE SYSTEM
Filed July 2, 1946      3 Sheets-Sheet 3

INVENTOR
ARCHIBALD GRAHAM FORSYTH,
BY Robert B. Larson
ATTORNEY

Patented Sept. 30, 1952

2,612,228

UNITED STATES PATENT OFFICE 2,612,228

ELECTRICALLY DRIVEN PROPELLER PITCH CHANGE SYSTEM

Archibald Graham Forsyth, Cheam, England, assignor to The Fairey Aviation Company Limited, Hayes, Middlesex, England Application July 2, 1946, Serial No. 680,896
In Great Britain July 3, 1945

4 Claims. (Cl. 170—160.23)

This invention relates to electrical equipment on aircraft and has for its object a self-contained electrical unit for association with a variable pitch propeller to provide means for varying the pitch of the propeller blades, and to generate current for electrical de-icing devices for the blades and spinner of such a propeller and for heating, lighting and other purposes on the aircraft.

Equipment for these purposes is described and claimed in the specification accompanying copending application for Letters Patent, Serial No. 630,407, filed November 23, 1945, now Patent 2,491,172, but the arrangement therein disclosed is such that an armature is rotated at propeller speed and is satisfactory in cases where the propeller rotates at high speed. There is a general tendency, however, towards the reduction of propeller speeds and the increase of current consumption necessitating considerable increase in the weight of the generator. By means of the present invention the introduction of a high speed drive permits reduction of the weight and over-all dimensions of the apparatus.

According to the present invention a dynamo-electric machine has its field coils and brush gear mounted on the front end of an aircraft engine, while its armature is arranged to be rotatable freely about the axis of the propeller shaft and to be driven from, and at a higher speed than, the propeller shaft through intermediate gearing.

In such an arrangement the armature may be formed integral with a gear wheel meshing with pinion wheels on spindles carrying second pinions meshing with a gear wheel keyed to the propeller shaft. This arrangement is used to change the gear ratios. In a modification of this arrangement the gear wheel with which the second pinions mesh may be arranged to be connected with, or disconnected from, the propeller shaft by a magnetic clutch and it may carry further pinions meshing with two gear wheels one of which is rotatable as one with the propeller shaft and the other of which is rotatable freely about the propeller shaft, has more teeth than its companion, and is integral with a gear wheel coaxial with the propeller shaft and meshing with pinions forming parts of pitch changing mechanism for the blades of the propeller.

In the accompanying drawings:

Figure 1 is a fragmentary section on an axial plane illustrating one form of the invention and Figure 2 is an end elevation of part thereof as seen from the position of line II—II, Figure 1.

Fig. 5 is a circuit diagram of the series field of the dynamoelectric machine, and Fig. 6 is a circuit diagram of the shunt field.

Figure 1:
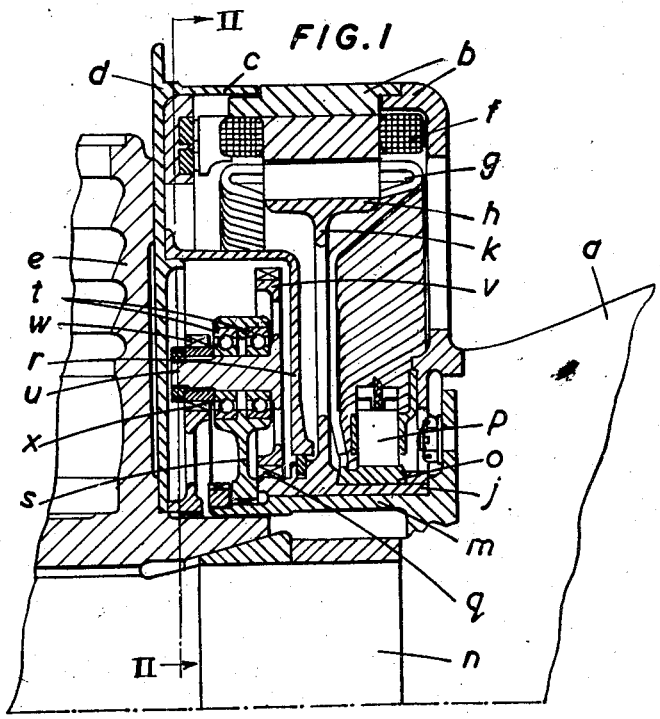

In the form of the invention shown in Figures 1 and 2, there is secured coaxially on the nose $a$ of an aircraft engine (not otherwise shown) a cylindrical casing $b$ of small axial length, open at its front end and arranged to fit freely into a coaxial flange $c$ projecting rearwardly from a plate $d$ arranged to the rear of, and rotatable with, a propeller hub $e$. At the inner periphery of the casing $b$ are mounted the field coils $f$ of a dynamoelectric machine, the armature $g$ of which is mounted on the peripheral flange of a substantially H section rotor. The sides of said rotor section are coaxial cylindrical sleeves $h$ and $j$, and the web $k$ of said section (which may be perforated or gapped for the sake of lightness) is normal to the axis of rotation. The inner sleeve $j$ of the rotor is rotatably mounted on a fixed coaxial sleeve $m$ surrounding the propeller shaft $n$ and secured to the nose $a$ of the engine. The inner sleeve $j$ extends both rearwardly and forwardly from the web $k$, and has mounted on its rearward extension $a$ commutator $o$ which cooperates with brushes $p$ carried by the rear wall of the cylindrical casing $b$. The forward extension of sleeve $j$ is formed at $q$ as a gear-wheel.

Mounted at the rear of the hub $e$ and plate $d$ is a cylindrical gear casing $r$ which is fixed to plate $d$ so as to rotate as one with the hub $e$. Gear casing $r$ projects rearwardly into the annulus presented by the forward side of the H section rotor $h$, $j$, $k$. Gear casing $r$ has an enlarged rear opening permitting the forward extension of the inner sleeve $j$ of the rotor and also the forward end of the fixed sleeve $m$ to project into this gear casing $r$.

Within the gear casing $r$ and splined near the forward end of the fixed sleeve $m$ is a fixed spider $s$ carrying three equi-angularly spaced sets of bearings $t$ in which are mounted shafts such as $u$. Each shaft $u$ has at its rear end a relatively large pinion wheel $v$ meshing with the gear wheel $q$ on the forward extension of the inner sleeve $j$ of the rotor for changing the gear ratio, while each shaft $u$ carries on its front end a relatively small pinion $w$ meshing with a gear wheel $x$ keyed on the propeller hub $e$.

In operation, it will be apparent that with sleeve $m$, spider $s$, casing $b$, and field coils $f$ all stationary, rotation of propeller shaft $n$ rotates hub $e$, plate $d$ and gear wheel $x$. Pinions $w$ are driven by rotation of gear wheel $x$ and rotary motion is transmitted through shafts $u$ to pinion wheels $v$ which mesh with gear wheel $q$ formed on the forward portion of sleeve $j$. This rotates sleeve $j$ which is part of the rotor carrying armature $g$. The gear train obviously causes a step up in the rotary speed of the rotor and armature $g$ over the speed of rotation of the propeller shaft $n$.

Figure 3:
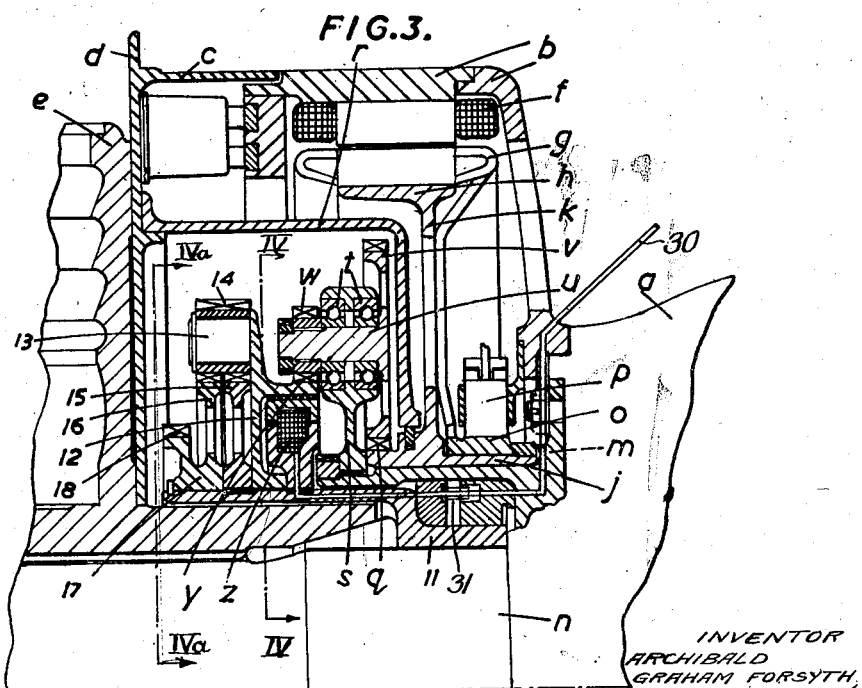
Figure 3 is a similar view to Figure 1 but illustrating a modified arrangement, the upper part of Figure 4 is an end elevation of part thereof as seen from the position indicated by the line IVa—IVa, Figure 3, and the lower part of Figure 4 is a section on the line IV—IV, Figure 3.
Figure 4:
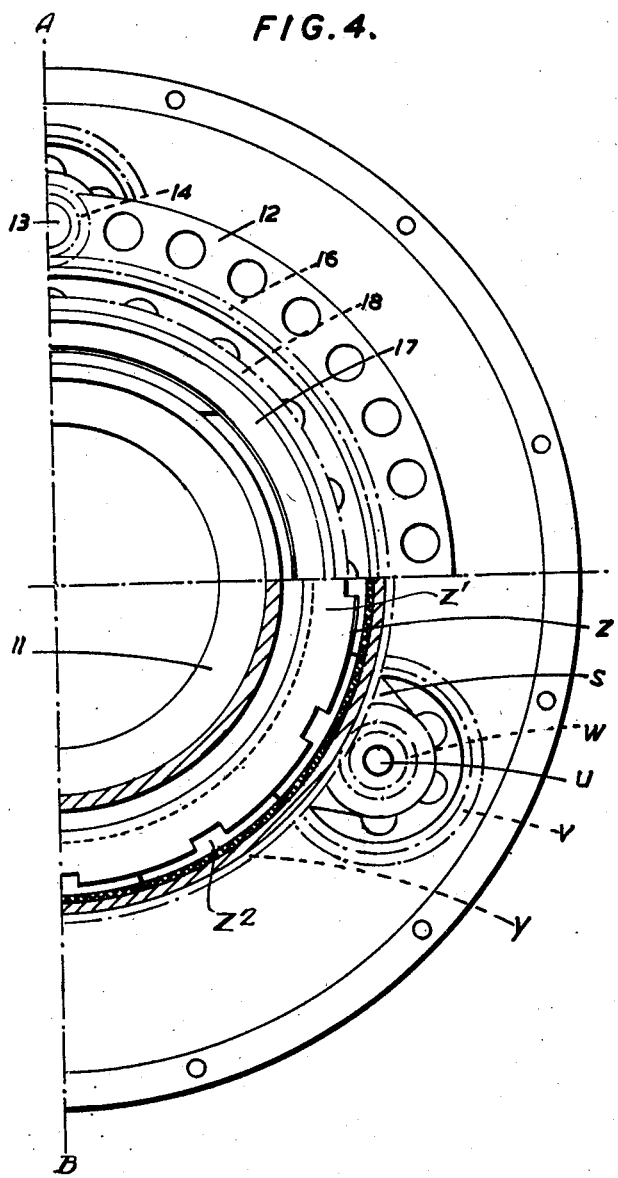

In the modified arrangement illustrated by Figures 3 and 4, the structure is the same except for the driving of pinions $w$. The pinions $w$ (instead of meshing, as shown in Figures 1 and 2, with the gear wheel $x$ keyed on the propeller hub $e$), mesh with a gear wheel $y$ forming the outer component of a magnetic clutch or brake (of the radially acting type as shown generally in Patent No. 432,209) which has an inner component $z$ splined to a sleeve 11 which is mounted on propeller shaft $n$ and positioned inside sleeve $m$ so as to be rotatable as one with the propeller shaft $n$. Inner component $z$ is comprised of a central portion $z'$ and outer portions or shoes $z^2$ radially movable with respect to the central portion. Springs (not shown) normally urge the outer portions $z^2$ radially outwardly into contact with the inner surface of gear wheel $y$, but energization of the magnetic elements of the clutch causes radially inward movement of shoes $z^2$ and uncoupling of gear wheel $y$ and portions $z^2$. The gear wheel $y$ is formed on a rearward projection of a spider 12 rotatably mounted about a portion of sleeve 11. Spider 12 carries three equi-angularly spaced spindles 13, on each of which is a wide pinion 14 meshing with two gear wheels 15, 16 disposed side by side.

Current for energizing magnetic clutch $z$ is carried by fixed wires 30 through a brush and ring arrangement 31 to wires 32 carried by sleeve 11.

Gear wheel 15 is keyed to the rotating sleeve 11, and gear wheel 16 is rotatably mounted on sleeve 11. The gear wheel 16 has more teeth than the gear wheel 15 (for example three more), but the teeth of both gear wheels 15, 16 are cut on the same pitch circle. Gear wheel 16 has a forward extension 17 formed with external teeth 18 meshing with gear wheels (not shown) on worm shafts extending tangentially with respect to the roots of the propeller blades, the roots of said blades having worm wheels formed therearound. This arrangement of gear wheels and worm gearing is not illustrated as it is well known and does not form part of the present invention.

In the modification of Figs. 3 and 4, the magnetic clutch $y$, $z$ is normally deenergized and springs (not shown) urge outer portions or shoes $z^2$ radially outwardly to couple outer shoes $z^2$ with the inner periphery of sun wheel $y$, thus transmitting rotation from sleeve 11 to wheel $y$, to gear $w$, to shaft $u$, to wheel $v$, through gear $q$ to $j$, $k$, $h$ and armature $g$. When this is done, the pinions $w$ are rotated and armature $g$ is thereby rotated at a higher speed than the propeller shaft in the manner explained above with respect to Figures 1 and 2. A control circuit shown in co-pending application 630,407 permits the pilot to operate appropriate switches in a control circuit for the clutch.

When the armature $g$ is in use for generating, which is the normal condition, the wide pinions 14, the two gear wheels 15, 16 and the externally toothed forward extension 17, 18 from the gear wheel 16 revolve en bloc with the propeller shaft $n$ and hub $e$, causing rotation of pinions $w$ as described above.

When the armature $g$ is to be rotated in either direction for pitch changing purposes, the magnetic clutch $y$, $z$ is energized and disengaged by operation of an appropriate control by the pilot, thus freeing gear $y$ from sleeve 11 and the propeller shaft. Through pilot operated automatic controls (see co-pending application referred to above), the dynamoelectric machine $f$, $g$ is energized as a motor. Energization of field coils $f$ in one sense or the other by direct current drives armature $g$ which drives the rotor and rotates sleeve $j$ and its gear wheel $q$. Gear wheel $q$ drives the pinion wheels $v$ at the rear ends of the shafts $u$, thereby rotating shafts $u$ and the pinions $w$ at the forward ends of those shafts $u$ to drive the gear wheel on the outer component $y$ of the magnetic clutch and the spider 12 integral therewith. The wide pinions 14 are carried by spider 12 and they roll round on the relatively fixed gear wheel 15 of the pair of gear wheels 15, 16. As the second gear wheel 16 of this pair has thereon three more teeth than the fixed gear wheel 15, it follows that the second gear wheel 16 is rotated relatively to the first, i. e. the relative positions of the two gear wheels 15, 16 change by the angular extent of three teeth per revolution of the spider 12. This brings about rotation of the gear wheel 18 on the extension 17 of the second gear wheel 16 and rotation of the gear wheels (not shown) on the pitch changing worm shafts. As described in the co-pending case referred to above, such rotation may be controlled by pitch limit switches, so as to give automatic control of pitch changes.

The field windings $f$ of the dynamoelectric machine $f$, $g$ may be subdivided so that the whole may be used for generating purposes or when maximum power is required for motoring purposes but, when the machine is used for pitch changing with constant speed governing, only a part of the field $f$ need be employed thus reducing current consumption. The circuits for accomplishing this are shown in Figs. 5 and 6, wherein are seen the twenty-four poles of the machine, twelve of which are series and the other twelve of which are shunt. The even numbers $f2$, $f4$, $f6$, etc. up to $f24$ comprise the series field, while the odd numbers $f1$, $f3$, $f5$, etc. up to $f23$ comprise the shunt field. All coils are connected for maximum output at 110 volts.

For 24 volt supply, the use of coils $f5$, $f11$, $f17$, and $f23$ in the shunt circuit and all series coils is required, this being controlled by a control relay (not shown) in the master control unit (not shown). When the relay is off, effective coils $f5$, $f11$, $f17$, and $f23$ are operative for 24 volts. When the relay is on, all coils become effective for 110 volts.

When the machine $f$, $g$ is to be used as a motor, current may be supplied thereto from accumulators but, in the case of a multi-propeller aircraft, switch mechanism may be provided to enable the output from the dynamoelectric machines associated with the engines of some of the propellers to be fed to the dynamoelectric machines associated with the engines of other propellers, so that they may be used as motors for pitch changing purposes.

It is to be noted that in all forms of the present invention the means by which the armature $g$ of the dynamoelectric machine $f$, $g$ is driven from the propeller shaft $n$ are such that the armature $g$ is driven at a higher speed, so that without increasing the weight of the dynamoelectric machine or the space which it occupies, it may be used on aircraft, the propeller shafts of which are rotated at slower speeds than those contemplated when use is made of the mechanism forming the subject of the above-mentioned co-pending application for Letters Patent, Serial No. 630,407.

I claim:

1. In an aircraft having a fixed nose part and a propeller shaft projection therefrom, a dynamoelectric machine having its field coils non-rotatably mounted on said fixed nose part about the axis of the propeller shaft, a sleeve attached to and projecting forwardly from said nose part coaxially with the propeller shaft, an armature for said machine rotatably mounted on said sleeve for free rotation with respect to said shaft, a step-up gearing to drive said armature at a higher speed than said propeller shaft comprising a first small gear integral with said armature, a second larger gear keyed to the propeller shaft, a small pinion supported by said sleeve and driven by said second gear, and a larger pinion driven by said small pinion, said larger pinion meshing with said first gear to rotate said armature.

2. In an aircraft having a fixed nose part and a propeller shaft projecting therefrom, a dynamoelectric machine having its field coils non-rotatably mounted on said fixed nose part about the axis of the propeller shaft, a sleeve attached to and projecting forwardly from said nose part coaxially with the propeller shaft, an armature for said machine rotatably mounted on said sleeve for free rotation with respect to said shaft, a step-up gearing to drive said armature at a higher speed than said propeller shaft comprising a first small gear integral with said armature, a second larger gear keyed to the propeller shaft, a small pinion supported by said sleeve and driven by said second gear, and a larger pinion driven by said small pinion, said larger pinion meshing with said first gear and a magnetic clutch interposed between said propeller shaft and the gear teeth of said second gear for selectively connecting and disconnecting said second gear with said propeller shaft.

3. In an aircraft having a fixed nose part and a propeller shaft projecting therefrom, a dynamoelectric machine having its field coils non-rotatably mounted on said fixed nose part about the axis of the propeller shaft, a sleeve attached to and projecting forwardly from said nose part coaxially with the propeller shaft, an armature for said machine rotatably mounted on said sleeve for free rotation with respect to said shaft, a step-up gearing to drive said armature at a higher speed than said propeller shaft comprising a first small gear integral with said armature, a second larger gear keyed to the propeller shaft, a small pinion supported by said sleeve and driven by said second gear, and a larger pinion driven by said small pinion, said larger pinion meshing with said first gear, a third pinion, means mounting said third pinion on said second gear, third and fourth gears arranged side by side in mesh with said third pinion, said third gear rotatable as one with said propeller shaft and said fourth gear being mounted for free rotation about the propeller shaft and having more teeth than said third gear, a pitch changing gear wheel integral with said fourth gear, and a magnetic clutch interposed between said propeller shaft and the gear teeth of said second gear for connecting and disconnecting said second gear and the propeller shaft, whereby connection of the second gear with said propeller shaft causes rotation of said armature from the propeller shaft through step-up gearing, and disconnecting of the second gear from the propeller shaft permits use of said dynamoelectric machine as a motor to drive said pitch changing gear wheel from said dynamoelectric machine.

4. In an aircraft having a propeller equipped with pitch changing mechanism and mounted on a propeller shaft, the combination of a rotary dynamoelectric machine operable selectively as a motor and as a generator and having a stator and a rotor mounted about the propeller shaft, a first gear fixedly mounted on and rotatable as one with said shaft, step-up gearing means connecting said first gear to said rotor and drivable from said shaft for driving said rotor at a higher rotary speed than the propeller shaft, and second gearing means connecting said rotor through said first gear to said pitch changing mechanism and operable for driving said pitch changing mechanism from said rotor when said machine is operated as a motor, and a clutch interposed between said shaft and the gear teeth on said first gear for selectively coupling and uncoupling said step-up gearing and the propeller shaft, thereby providing selective operation of said machine.

ARCHIBALD GRAHAM FORSYTH.

REFERENCES CITED

The following references are of record in the file of this patent:

UNITED STATES PATENTS

| Number | Name | Date |
|---|---|---|
| 684,453 | Neeper | Oct. 15, 1901 |
| 882,878 | Ford | Mar. 24, 1908 |
| 1,823,217 | Sparkes | Sept. 15, 1931 |
| 2,124,791 | McNeal | July 26, 1938 |
| 2,256,794 | Schwab | Sept. 23, 1941 |
| 2,365,676 | Burkhalter | Dec. 26, 1944 |
| 2,370,135 | Berliner | Feb. 27, 1945 |
| 2,430,705 | Brown | Nov. 11, 1947 |
| 2,491,172 | Forsyth | Dec. 13, 1949 |

FOREIGN PATENTS

| Number | Country | Date |
|---|---|---|
| 327,958 | Germany | May 10, 1921 |